(12) United States Patent
Boufounos et al.

(10) Patent No.: US 9,897,698 B2
(45) Date of Patent: Feb. 20, 2018

(54) INTENSITY-BASED DEPTH SENSING SYSTEM AND METHOD

(71) Applicant: Mitsubishi Electric Research Laboratories, Inc., Cambridge, MA (US)

(72) Inventors: Petros T Boufounos, Arlington, MA (US); Achuta Kadambi, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 403 days.

(21) Appl. No.: 14/628,360

(22) Filed: Feb. 23, 2015

(65) Prior Publication Data

US 2016/0245920 A1    Aug. 25, 2016

(51) Int. Cl.
| | |
|---|---|
| *G01S 17/89* | (2006.01) |
| *G01S 17/32* | (2006.01) |
| *G01S 7/486* | (2006.01) |
| *G01S 17/10* | (2006.01) |
| *G01S 7/484* | (2006.01) |

(52) U.S. Cl.
CPC .............. *G01S 17/89* (2013.01); *G01S 7/484* (2013.01); *G01S 7/4861* (2013.01); *G01S 17/107* (2013.01); *G01S 17/32* (2013.01)

(58) Field of Classification Search
CPC ........ G01S 17/023; G01S 17/42; G01S 17/89; G01S 7/4868; G01S 17/10; G01S 7/4861; G01S 7/4865
See application file for complete search history.

(56) References Cited

U.S. PATENT DOCUMENTS

| | | | |
|---|---|---|---|
| 6,100,517 A | 8/2000 | Yahav et al. | |
| 2005/0162638 A1* | 7/2005 | Suzuki | ..................... G01C 3/08 |
| | | | 356/4.04 |
| 2010/0128109 A1 | 5/2010 | Banks et al. | |
| 2010/0303299 A1 | 12/2010 | Cho et al. | |
| 2013/0107000 A1* | 5/2013 | Xue | ..................... G01S 17/023 |
| | | | 348/46 |

FOREIGN PATENT DOCUMENTS

| | | |
|---|---|---|
| DE | 4439298 A1 | 6/1996 |
| IL | 2005076037 A1 | 8/2005 |

\* cited by examiner

*Primary Examiner* — Luke D Ratcliffe
(74) *Attorney, Agent, or Firm* — Genevinokur; James McAleenan; Hironori Tsukamoto

(57) ABSTRACT

A system for determining a depth image representing distances to points of a scene includes a light source for generating and directing a set of light pulses toward the scene and a set of sensors for detecting and integrating light reflected from the scene. Each sensor is associated with a point in the scene and generates a signal indicative of an amount of light reflected from the point in the scene and reaching the sensor during a period of time. The system includes at least one processor for coordinating operations of the light source and the set of sensors and for determining the depth image having intensity values representing the distances to the points in the scene. The processor commands the light source to generate the set of light pulses including a first pulse with a first intensity profile having portions of identical lengths with different integrated intensities.

18 Claims, 5 Drawing Sheets

INTENSITY-BASED DEPTH SENSING SYSTEM AND METHOD

FIELD OF THE INVENTION

This invention relates to depth sensing systems and methods, and more specifically to determining a depth image indicating distances to points of objects in a scene.

BACKGROUND OF THE INVENTION

Depth sensing is a technology for measuring depths in a scene, i.e., the distances from a sensor to points of in the scene. Types of depth sensing include measurements using structured light cameras, stereo cameras, and depth sensing cameras based on time-of-flight (TOF) measurements of the light reflected from the scene.

For example, structured light cameras illuminate the scene using spatially modulated light. Because of the physics of the light propagation, the structured light cameras have fixed angular resolution, resulting in decrease of the depth resolution as the depth of the scene increases.

A stereo camera records the same scene from two different viewpoints. The depth of each point in the scene is determined using disparities between the points of the scene as observed in two images acquired by the stereo camera. The disparities are directly related to depths. The stereo camera is a passive system, i.e., the camera does not illuminate the scene. However, the resolution of the stereo camera decreases as the depth increases.

Some TOF cameras use time-resolved sensors for determining the TOF using a shape of the reflected light. However, such sensors are expensive and include several mechanical components, e.g., scanning mechanisms, which are prone to failure.

Alternatively, it is possible to measure the TOF by integrating the amount of reflected light received after a certain time. Integrating light is simpler and cheaper than using time-resolved sensors and can be achieved, e.g., using a charged coupled device (CCD) sensor or a carbon-metal-oxide semiconductor (CMOS) sensor, see, e.g., U.S. Pat. No. 6,100,517. However, the range of depth values that such a system can determine is limited by the capacity of the sensor that integrates the light. If the energy of the transmitted pulse is too high, then nearby points in the scene cause the sensors to saturate. On the other hand, if the energy is too low, then distant points in the scene do not receive sufficient light to produce a reflection that can be detected by the sensor.

Therefore, the conventional light integrating systems have a limited dynamic range and are appropriate for limited indoor use and ill-suited for the outdoors. This is because a typical outdoors application requires much larger depth range and field of view, compared to the limited size of indoors areas. Thus, there is a need to increase the dynamic range of the light integrating systems, e.g., for determining the depths in images acquired of an outdoor scene.

SUMMARY OF THE INVENTION

It is an object of some embodiments of the invention to increase a dynamic range of depth values that an intensity-based depth sensing system can determine. It is another object of some embodiments to provide an intensity-based depth sensing system suitable for depth sensing of outdoor scenes.

The intensity-based depth sensing system illuminates the scene with the light pulses and determines the depth, i.e., distance, to the scene by integrating intensity of the reflected light. At each point in the scene, the intensity of the reflection received within a period of time, e.g., beyond some time delay, is a function of the distance to the point, and can be used to determine that distance.

The dynamic range of the intensity-based depth sensing system is limited by the capacity and sensitivity of the sensors of the depth sensing system. For example, if the intensity of the light pulse transmitted by the system is too high, then reflection of the light pulse from the points in the scene near the system causes the sensors to saturate. On the other hand, if the intensity is too low, then the distant points in the scene can fail to receive sufficient light to produce a reflection that can be detected by the sensors.

Some embodiments of the invention are based on a realization that dynamic range of the intensity-based depth sensing systems depends on a difference between the amount of light received from near and far points of the scene. Specifically, the reduction of such a difference can increase the dynamic range of the depth sensing system. Therefore, some embodiments of the invention vary the intensity profile of the transmitted light pulse to increase a uniformity of the light received from points at different depth.

In some embodiments, the integrated light reflected from the near points includes only a small portion of the transmitted light pulse, but of a high intensity due to low light dissipation. Conversely, the integrated light reflected from the distant points includes a greater portion of the transmitted light pulse, but of lower intensity due to high light dissipation. However, because of the pulse dissipation, the integration of the small portion of the light pulse but of high intensity can be significantly larger than the integration of the greater portion of the light but of lower intensity. Therefore, to reduce the difference between the integration of light reflected from near and distant points, some embodiments reduce the intensity of the portions of light pulse received from both the near and distant points, as compared with intensities of the light received only from the distant objects.

For example, some portions of the light pulse are received by the sensor as reflected from both the close and the distant points in the scene. However, some other portions of the reflected light pulse are received only from the more distant points due to specifics of light propagation and gated integration of the intensity-based depth sensing systems. Therefore, some embodiments vary, e.g., reduce, the intensity of commonly received portions of the light pulse with respect to the intensities of the portions of the light pulse received only for the distant points. In such a manner, the lower intensity of the light reflected from near points can help to avoid saturation, while the lower intensity of the light reflected from the distant points is compensated by additional portions of light pulse with higher intensity that is received only from the distant points.

For example, for the light pulses with constant, i.e., flat, intensity profile, as the distance increases, the area of the pulse being integrated increases at a fixed rate that is proportional to the distance. However, for the light pulses with decreasing intensity profile, as the distance increases, the area of the pulse being integrated increases at an increasing rate, e.g., quadratic or cubic to the distance. On the other hand, the light pulse is dissipated as distance increases by a rate higher than the increase in the distance. Therefore, by using a decreasing intensity profile, more distant points produce stronger measurements compared to those produced when using pulses with flat intensity profiles. Therefore, the overall gain of the system can be reduced, so that near points do not saturate the sensors, while more distant points are still detectable by the sensors.

Accordingly, one embodiment of the invention discloses a system for determining a depth image representing distances to points of a scene. The system includes a light source for generating and directing a set of light pulses toward the scene; a set of sensors for detecting and integrating light reflected from the scene, each sensor is associated with a point in the scene and generates a signal indicative of a portion of each light pulse reflected from the point in the scene and reaching the sensor during a corresponding period of time; and at least one processor for coordinating operations of the light source and the set of sensors, such that each light pulse is integrated within the corresponding period of time, and for determining, based on a magnitude of the signal associated with each point, the depth image having intensity values representing the distances to the points in the scene, wherein the processor commands the light source to generate the set of light pulses including a first pulse with a first intensity profile having portions of identical lengths with different integrated intensities.

Another embodiment discloses a method for determining a depth image indicating distances to points of a scene. The method includes commanding to generate a first light pulse having a first intensity profile with varying integrated intensity over a window sliding within the first pulse and to direct the first light pulse toward the scene; determining a first set of signals indicative of amount of light of the first pulse reflected from each point in the scene within a first period of time; and determining, based on a magnitude of the signals associated with each point, the depth image having intensity values indicative of the distances to the points in the scene. At least some steps of the method are performed using a processor.

DETAILED DESCRIPTION OF THE PREFERRED EMBODIMENT

Figure 1:
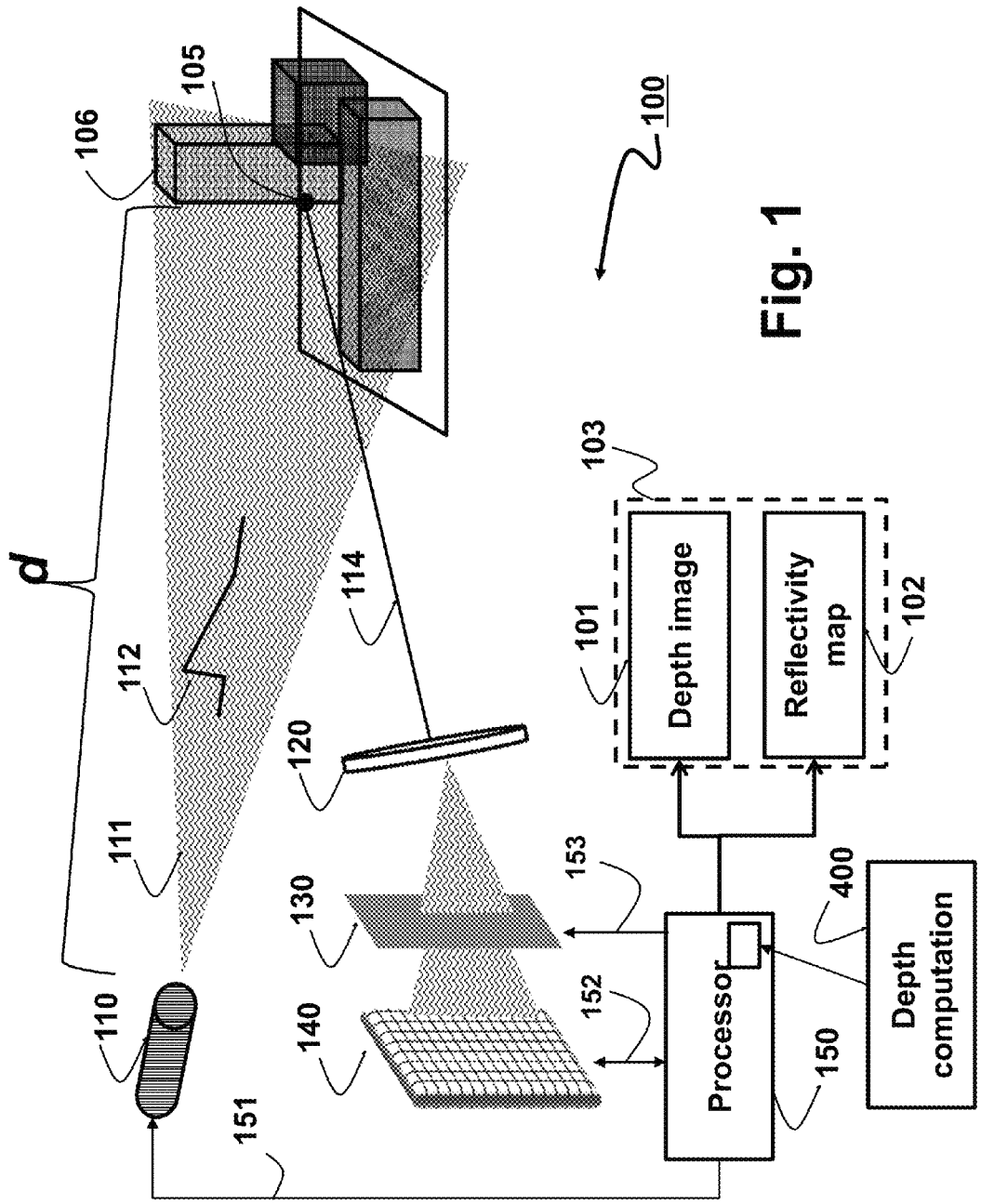
FIG. 1 is a schematic diagram of an intensity-based depth sensing system and method for determining a depth image indicating distances to points in a scene according to some embodiments of an invention.

FIG. 1 shows a schematic (not a block) diagram of a system 100 for determining a depth image 101 indicating distances to points in a scene 106 according to some embodiments of an invention. The system includes a light source 110 for generating and directing a set of light pulses toward the scene. For example, the light source 110 can transmit a wide-beam light pulse 111 with a certain intensity profile 112, i.e., a shape of the pulse. In various embodiments, the intensity profiles of the light pulses are shaped according to desired properties for the sensing system. In one embodiment, the light source is a laser. However, other embodiments use different light sources, such as a photodiode, suitable for transmitting light source with different intensity profiles.

The light pulse propagates to the scene 106, illuminates the scene and is reflected by the points in the scene. Each point 105 of the scene reflects 114 the incident light back to the system. The reflected light pulse passes through a lens 120 and a gating module 130 allowing the light pulse to reach a set of sensors 140 only during a period of time. Typically, but not necessarily, the sensors are arranged as a regular two-dimensional array. In one embodiment, the light source and sensors are coplanar.

If the point in the scene is at distance d from the sensor, then the light pulse travels a distance 2d, i.e., has a travel time, i.e., time-of-flight (TOF), $\tau=2d/c$, wherein c is the speed of light. Thus, if the TOF $\tau$ can be determined, the distance of the scene point from the sensor is $c\tau/2$ when the light source and sensor are coplanar.

The system 100 is an intensity-based system determining the depth to the scene by integrating intensity of the reflected light. At each point in the scene, the intensity of the reflection received within a period of time, e.g., after the time delay controlled by the gating module, is a function of the distance of the point and, therefore, the distance can be calculated as using the two intensity values recorded.

The gating module blocks or allows light to pass through to the sensors, according to an external signal. The sensor integrates the portion of the light energy that is not blocked by the gate. Each sensor corresponds to a pixel, i.e., senses the depth of a point in the scene to generate a signal indicative of amount of light reflected from the point in the scene and reaching the sensor during the period of time allowed by the gate module.

Some devices that provide arrays of such sensors include charged-coupled-device (CCD) or carbon-metal-oxide semiconductor (CMOS) sensor arrays. Furthermore, such devices, using techniques such as, e.g., "charge reset" function and "global shutter" function, often provide an internal gating mechanism. Thus, a separate gating mechanism, external to the sensor array, is not necessary in some embodiments.

The system 100 includes at least one processor 150 for controlling the light source, e.g., for commanding the light source to generate light pulse at specified times and with specified intensity profiles. For example, according to the various embodiments, the processor commands the light source to generate the first pulse with the first intensity profile having different non-zero intensity values. The processor 150 also controls opening and closing 153 of the gating module 130, integration time 152 of the sensors, and determines 400, based on a magnitude of the signal generated by the sensors associated with each point, the depth image having intensity values indicative of the distances to the points in the scene. Optionally, the processor can also produce a reflectivity map 102 of the scene. Control of and communication between components of the system 100 can be performed in a variety of methods, such as a local bus, a serial interface, or an electronic trigger signal. The depth image 101 and/or the reflectivity map 102 can be stored in a memory 103 operatively connected to the processor 150.

Some embodiments of the invention are based on realization that dynamic range of the intensity-based depth sensing systems depends on a difference between amount of light received from the close and the distant points of the scene. Specifically, the reduction of such a difference can increase the dynamic range of the depth sensing system. Therefore, some embodiments of the invention vary the intensity profile of the transmitted light pulse to increase a uniformity of the light received from points of different depth.

Accordingly, in some embodiments the set of light pulses includes a first pulse having a first intensity profile, and wherein the processor commands the light source to generate the first pulse with the first intensity profile having different non-zero intensity values. Such an intensity profile with different non-zero intensity values allows to vary, e.g., reduce, the intensity of commonly received portions of the light pulse with respect to the intensities of the portions of the light pulse received only for the distant points. In such a manner, the lower intensity of the light reflected from the close points can help to avoid saturation, while the lower intensity of the light reflected from the distant points is compensated by additional portions of light pulse with higher intensity that received only from the distant points.

The embodiments can use different method to generate such the light pulse with such an intensity profile. For example, in one embodiment, the processor generates an electronic signal with the same shape as the desired shape of the intensity profile of the pulse. The electronic signal is input to the light source driving circuit, which drives the light source to transmit a light pulse with the same shape. In some embodiments, the electronic signal is a transformation of the shape of the intensity profile, such as an integral or a derivative of the shape.

Figure 2A:
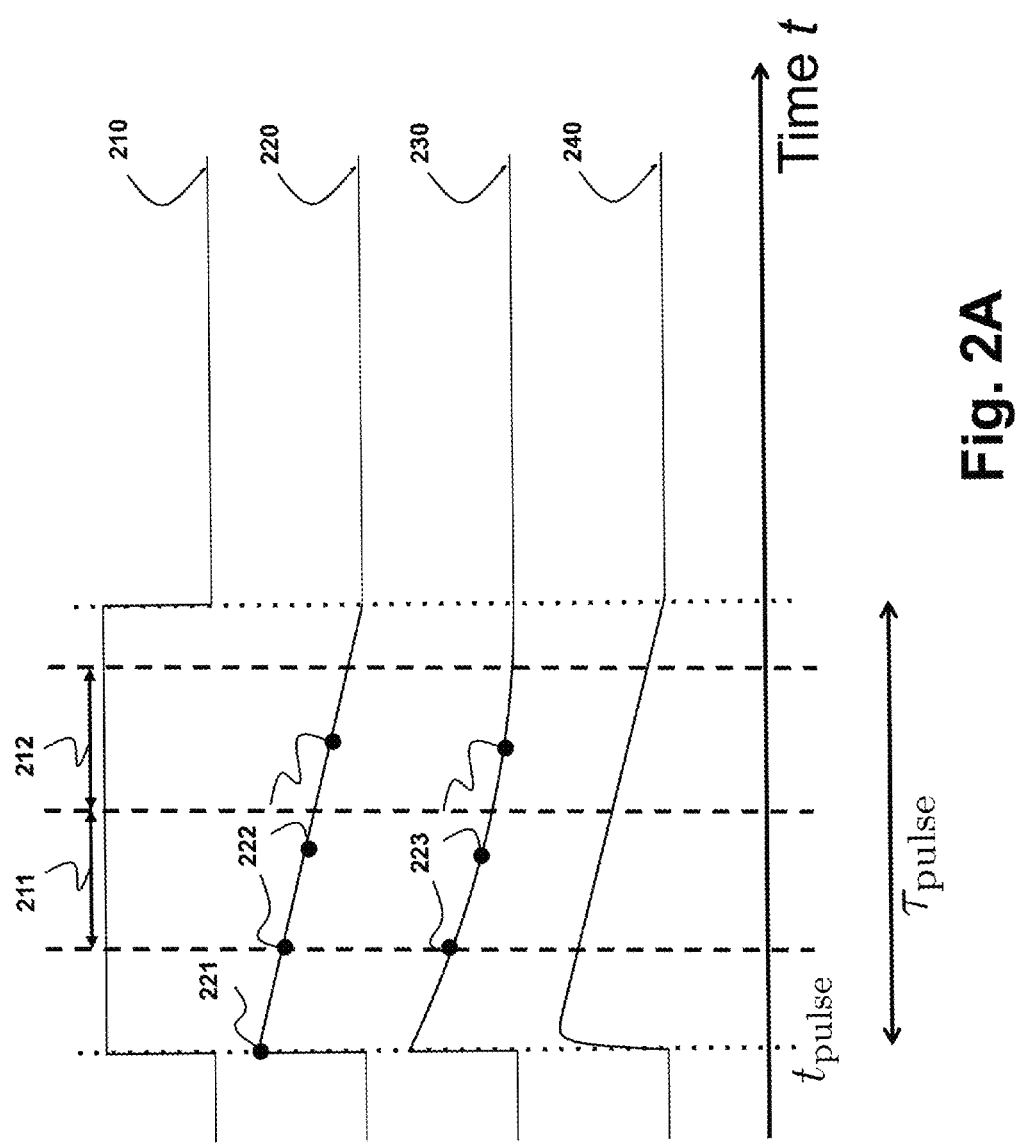
FIG. 2A is a diagram of shapes of intensity profiles of light pulses generated by the system of FIG. 1 according to some embodiments of the invention.

FIG. 2A shows a diagram of different shapes of intensity profiles generated by the system 100. For example, the processor 150 commands to the light source 110 to generate a set of light pulses including a first pulse with a first intensity profile and a second pulse with a second intensity profile. In various embodiments, the processor commands the light source to generate the first pulse with the first intensity profile having portions of identical lengths with different integrated intensities. For example, the portions 211 and 212 of the pulse are of identical length or duration. For the first profile of the pulse 220 formed by different non-zero intensity values, the integrated intensity in those portions 211 and 212 are different. Examples of the first intensity profile with varying integrated intensities include a linear decreasing pulse 220, i.e., the intensity profile is linearly decreasing starting from its maximal value, or a quadratic decreasing pulse 230, i.e., the intensity profile is quadratically decreasing starting from its maximal value. The pulses 220 and 230 are examples of the intensity profile with different non-zero intensity values 221, 222 or 223.

In several embodiments, the second intensity profile can have varying or constant integrated intensity. For example, in the pulse 210 having a flat intensity profile, the portions 211 and 212 have identical integrated intensities.

Figure 2B:
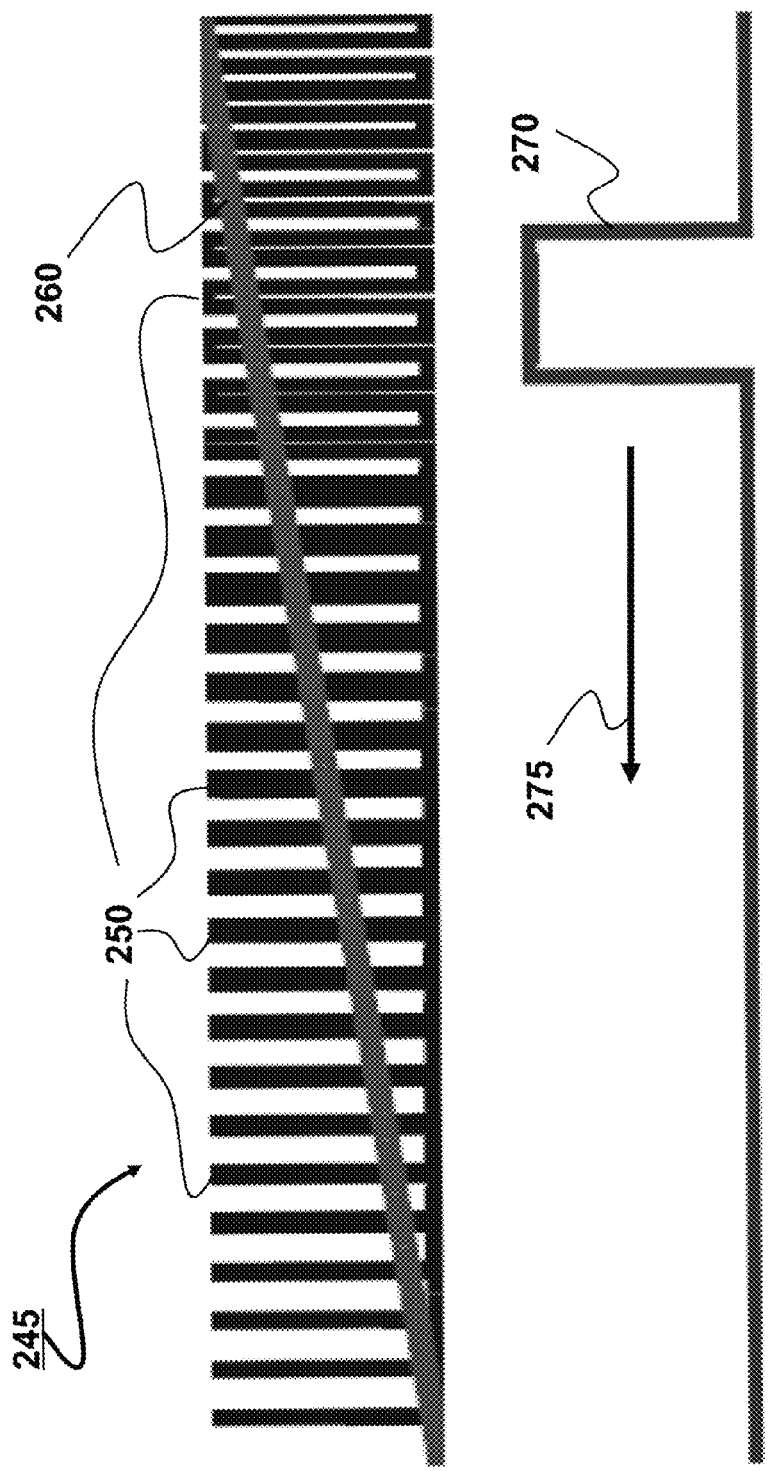
FIG. 2B is an example of a light pulse with intensity profiled formed by a set of unit pulses of different width according to some embodiments of the invention.

FIG. 2B shows an example of a light pulse 245 with intensity profiled formed by a set of unit pulses 250 of different width. Such an intensity profile also includes portions of identical lengths with different integrated intensities. For example, the different width of the unit pulses and/or different periods between the unit pulses result in varying integrated intensity 260 over a window 270 sliding 275 within the pulse.

The second intensity profile can have the same or different shape than shape of the first intensity profile. For example, the second intensity profile can have a flat shape 210 defined by a single non-zero intensity value. Such a flat shape can limit the dynamic range of the depth sensing system if use along or in combination with other pulses of a flat shape. However, some embodiments use the pulse with flat intensity profiles in combination with other pulses of different intensity profiles.

Additionally or alternatively with variations of the intensity profiles of the first and the second light pulses, some embodiment vary the gating time permitting the pulses to reach the sensors. For example, in one embodiment, the light source generates the first pulse and the second pulse sequentially, wherein the gating module permits a portion of the first pulse to reach the set of sensors within a first period of time, and permits a portion of the second pulse to reach the set of sensors within a second period of time, wherein a length of the first period of time is different than a length of the second period of time.

The light pulses are transmitted at time $t_{pulse}$, and have duration $\tau_{pulse}$. The timing and the duration are set according to the required specification for the system. In one embodiment, $\tau_{pulse}$ is equal to $\tau_{pulse}=2d_{max}/c$, where $d_{max}$ is a maximal operative range.

It is difficult for some depth sensing systems to implement the idealized pulses 210, 220, and 230. For example, a practical implementation of a linearly decreasing pulse 240 is a smoothed version of the corresponding idealized pulse 220. However, the processor 150 commands the lighting source to generate the idealized shapes of the light pulses.

For example, in some embodiments the processor commands to increase the intensity values of the first intensity profile to reach a maximal intensity value 221 with subsequent decrease of the intensity values through a set of intermediate non-zero intensity values 222. For example, in one embodiment, the first intensity profile decreases over time for more than a half of a length of the first pulse.

However, the shapes of the intensity profile having different non-zero intensity values are not limited to profiles with constantly decreasing intensity values. For example, in some embodiments, such shapes includes flat portions with different non-zero intensity values, and/or flat portions connected by a set of increasing or decreasing intermediate values. Such shapes can be distinguished from shapes formed by repeated flat pulses with the identical non-zero intensity values.

Figure 3:
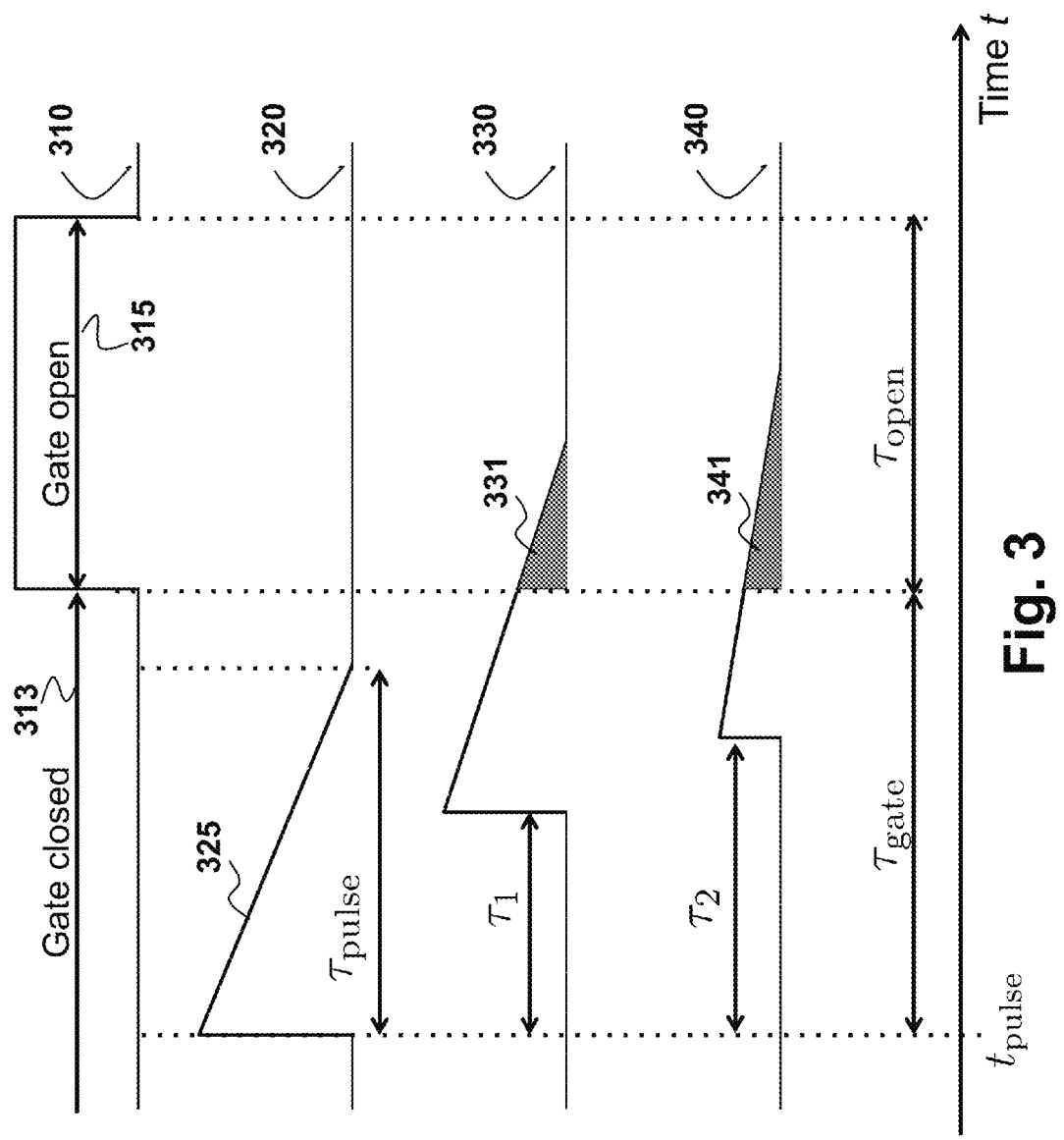
FIG. 3 is a timing diagram of an exemplar transmission of a light pulse according to some embodiments of the invention.

FIG. 3 shows a timing diagram of an exemplar transmission of a light pulse 320 according to some embodiments of the invention. The integration of the light pulse 320 is governed by the gate timing 310, i.e., at what time relative to the pulse the gate is open to allow light to pass through, and at what time the gate is closed to prevent light from reaching the sensors. In this example, at time period $\tau_{open}$ 315 the gate is open, and at time period 313 $\tau_{gate}$ the gate is closed. The pulse has duration $\tau_{pulse}$, which, in part, determines the maximal range of the system. The gate opens at time $\tau_{gate}$ after $t_{pulse}$, and stays open for time $\tau_{open}$. In this example, the intensity profile of the light pulse 320 has a linearly decreasing shape 325.

The light pulse travels to the points in the scene, and then the light pulse is reflected back to the sensor through the gate. As the light pulse travels, its energy is dispersed, which means that the energy reflected back to the sensor is attenuated according to an inverse square law. Furthermore, as the pulse is reflected from a point in the scene, the pulse is further attenuated according to the refectivity of the material of an object at that point. Thus, the pulse arriving at the sensor is a delayed and attenuated version of the transmitted pulse.

FIG. 3 shows two examples of the received versions of the light pulse 325. One version 330 is formed by the light pulse reflected from a nearby scene point, and another version 340 is formed by the light pulse reflected from a distant scene point. Each reflected pulse has a different delay, according to the distance to the point in the scene. For example the delay of the nearby scene point is $\tau_1$, this means that its distance is $d_1=\tau_1 c/2$. Similarly, if the distance of the distant scene point is $d_2$, then the corresponding time delay of the reflected pulse is $\tau_2=2d_2/c$. As shown in FIG. 3, the two reflected pulses are attenuated with different attenuation, each according to the distance and the reflectivity of the corresponding scene point.

The sensor only receives the portion of the pulse that the gate allows and integrates its energy. In the figure, this is depicted using the shaded area 331 or 341, which starts only after the gate opens. This area is the intensity value measured, i.e., sensed. This area is proportional to the energy of the reflected pulse and a function of the timing of the gate. For example, if two pulses arrive at the sensor with the same energy and different delays, then the pulse with the larger delay also has a larger area while the gate is open, i.e., register a value of a larger magnitude for the light energy integral at the sensor.

In one embodiment, the gate opens after the pulse transmission has started, i.e., $\tau_{gate} \geq 0$, although in an alternative embodiment, the gate opens prior to the transmission, i.e., $\tau_{gate} < 0$. Furthermore, in one embodiment the gate stays open at least as long as the length of the pulse, and possibly longer, i.e., $\tau_{open} \geq \tau_{pulse}$. However, this is not necessary. The fundamental mathematical principles of the system are the same if the gate is open for a shorter time. Keeping a shorter gate reduces the amount of light integrated, which can increase noise, but reduce saturation events and improve dynamic range.

The values of the timing diagram determine the properties of the system. In an example embodiment, the minimal distance sensed by the recording of the reflection of a transmitted pulse is $d_{min}=(\tau_{gate}-\tau_{pulse})c/2$, when $\tau_{gate}-\tau_{pulse} \geq 0$ and $d_{min}=0$ otherwise. Any reflection from a closer point does not cause sufficient delay for any portion of the reflected pulse to ovelap in time with the gating opening and pass through to the sensor. Furthermore, objects at distance $d > (\tau_{gate}+\tau_{open})c/2$, i.e., with corresponding delay greater than $\tau_{gate}+\tau_{open}$, also do not register with the sensor.

The system 100 transmits at least two pulses, with possibly different characteristics, i.e., different gating timings and different pulse shapes. For each pulse transmission, each sensor acquires a single value, which is equal to the total energy of the light reflected from the corresponding scene point and arriving at the sensor through the gating mechanism. If i denotes the number of the transmitted pulse and $p_i(t)$ to denote its shape in time, then the value of the integral acquired by the sensor due to the reflection of the $i^{th}$ pulse from a scene point is $$y_i = \int_{\tau_{gate}^i}^{\tau_{gate}^i+\tau_{open}^i} a \cdot p_i\left(t - \frac{2d}{c}\right) + B dt = B\tau_{open}^i + a \int_{\tau_{gate}^i}^{\tau_{gate}^i+\tau_{open}^i} p_i\left(t - \frac{2d}{c}\right) dt, \quad (1)$$

where $0 \leq a < 1$ denotes the total pulse attenuation due to the reflectivity of the scene point and the inverse square path loss, d denotes the distance of the scene point from the system, B denotes the power of the background radiation that the sensor acquires in addition to the reflected pulse, and $$\tau = \frac{2d}{c}$$

is the delay of the pulse traveling to the scene point and back. The acquired integral $y_i$ is also referred to as a measurement herein. Note that the gate timings now also have a superscript i, to denote the $i^{th}$ pulse, since gate timings can change for each pulse. On the other hand, the depth of the scene point, d, and the attenuation a, can be constant and independent of the pulse number.

In some embodiments, the background radiation B is negligible and can be ignored. In that case, eq. (1) has two unknowns, a and d. Thus, two measurements, i.e., i=1,2, with different conditions—either pulse shape, or gate timing, or both—are necessary and typically sufficient to recover the two unknowns. From these two measurements, one embodiment formulates a system of two equations for the two unknowns and solves that system of equations in the processor during the depth computation.

In other embodiments, the background is not negligible, and, therefore, three measurements are necessary, and typically sufficient, each with different conditions. As above, from these three measurements the processor formulates a system of equations for the unknowns and solves 400 the system of equations during the depth computation. For example, in one embodiment, the processor determines the depth image by solving a system of equations including a first equation representing an integration of the first pulse, a second equation representing an integration of the second pulse, a third equation representing an integration of ambient light integrated without transmission of the light pulses.

In some embodiments, the background radiation B may be estimated by transmitting only two pulses and measuring the corresponding reflected pulses, and then acquiring a third measurement from the sensor without transmitting a pulse. This is equivalent to setting $p_i(t)=0$ in eq. (1), for the corresponding measurement. Thus the background may be estimated using $$y_i = B\tau_{open}^i \Leftrightarrow B = \frac{y_i}{\tau_{open}^i}. \quad (2)$$

Thus, the estimated background can be subtracted from eq. (1), for the remaining two measurements, thus yielding, as above, a system of two equations and two unknowns.

In some embodiments, the integral in eq. (1) can be analytically computed. For example, if the pulse shape is the linearly decreasing pulse 320, i.e., $$p(t) = \begin{cases} c\left(1 - \dfrac{t}{\tau_{pulse}}\right) & 0 \leq t \leq \tau_{pulse} \\ 0 & \text{otherwise} \end{cases},$$

where c is a scalar determining the pulse amplitude and $\tau_{open} \geq \tau_{pulse}$, then a pulse delayed by $\tau \leq \tau_{gate}+\tau_{open}-\tau_{pulse}$ will produce measurement $$y = \begin{cases} B\tau_{open} & 0 \leq \tau \leq \tau_{gate} - \tau_{pulse} \\ \frac{ac}{2}\left(\frac{\tau - \tau_{gate} + \tau_{pulse}}{\tau_{pulse}}\right)^2 + B\tau_{open} & \tau_{gate} - \tau_{pulse} \leq \tau \leq \tau_{gate} \\ \frac{ac}{2} + B\tau_{open} & \tau_{gate} \leq \tau \leq \tau_{gate} + \tau_{open} - \tau_{pulse} \end{cases}$$

In a similar manner, some embodiments determine analytically the integral for other pulse shapes, such as polynomial of any degree, or exponentially decaying. The measurement is a function of the delay $\tau$, the total pulse attenuation $a$ and the background $B$, and generally has the form $$y = af(\tau) + B\tau_{open}, \text{ where } f(\tau) = \int_{\tau_{gate}}^{\tau_{gate}+\tau_{open}} p(t-\tau)dt.$$

Thus, there are three unknowns to be determined. In many applications, the background is negligible and the term $B\tau_{open}$ can be ignored, reducing the unknown terms to two. To be able to determine two or three parameters, the embodiments acquire at least two or three measurements, respectively. These measurements result to a system of equations with three unknowns that the reconstruction solves to determine the parameters of interest $a$ and $\tau$.

In an example preferred embodiment, the system obtains three measurements, one by transmitting a flat pulse, such as pulse 210, one by transmitting a linear pulse, such as pulse 220, and one measurement without transmitting a pulse and just opening the gate to acquire the background radiation intensity, as described above and in equation (2). In this example, $\tau_{pulse} = \tau_{gate}$ and $\tau_{open} > \tau_{pulse}$. This embodiment measures distances up to a maximal distance $$\frac{c\tau_{pulse}}{2}.$$

It is assumed that points farther than $$\frac{c\tau_{pulse}}{2}$$

do reflect sufficient light to be measured by the sensor.

If measurements $y^1$, $y^2$, and $y^3$ correspond to measuring using a flat pulse, a linear pulse, and no pulse, respectively, then $$y_1 = \frac{ac_1\tau}{\tau_{pulse}} + B\tau_{open},$$

$$y_2 = \frac{ac_2}{2}\left(\frac{\tau}{\tau_{pulse}}\right)^2 + B\tau_{open},$$

$$y_3 = B\tau_{open},$$

where $c_1$ and $c_2$ are the amplitudes of the flat and the linear pulse, respectively. Thus, we can subtract $y_3$ from $y_1$ and $y_2$ to obtain background-free measurements $\tilde{y}_1$ and $\tilde{y}_2$, $$\tilde{y}_1 = \frac{ac_1\tau}{\tau_{pulse}}, \qquad (3)$$

$$\tilde{y}_2 = \frac{ac_2}{2}\left(\frac{\tau}{\tau_{pulse}}\right)^2.$$

The time delay estimate $\hat{\tau}$ can then be computed as $$\frac{\tilde{y}_2}{\tilde{y}_1} = \frac{c_2\tau}{2c_1\tau_{pulse}} \Longrightarrow \hat{\tau} = \frac{\tilde{y}_2}{\tilde{y}_1} \cdot \frac{2c_1\tau_{pulse}}{c_2}.$$

The distance estimate $\hat{\tau}$ can be computed from the time delay using $$\hat{d} = \frac{\hat{\tau}c}{2} \Longrightarrow \hat{d} = \frac{\tilde{y}_2}{\tilde{y}_1} \cdot \frac{c_1 c\tau_{pulse}}{c_2}. \qquad (4)$$

The attenuation can be similarly estimated in a straightforward manner from the time delay using either $\tilde{y}_1$ or $\tilde{y}_2$ in (3). The estimate, $\hat{a}$, can be computed using $$\hat{a} = \frac{\tilde{y}_1^2 c_2}{2\tilde{y}_2 c_1^2}. \qquad (5)$$

The estimates computed in eqs. (4) and (5) are derived from the measurements of a single sensor. Many embodiments use more than one sensor, each corresponding to a scene point, and a depth and attenuation should be computed for each point. In the preferred embodiments, the sensors are arranged in a two dimensional (2D) array of pixels, typically placed on a uniform 2D grid. From these sensors, a 2D matrix of depth estimates $\hat{d}$, with elements $\hat{d}_{i,j}$ and a 2D matrix of attenuations $\hat{a}$, with elements $\hat{a}_{i,j}$ can be computed, where $(i,j)$ are the 2D coordinates of the pixel.

The 2D matrix of attenuations is equivalent to an image acquired of the scene. It is usually referred as the reflectivity map. The 2D matrix of depths is the depth map of the scene. Due to the attenuation of light from distant points, both the attenuation map and the distance map are noisy. Thus, computational techniques can be used for de-noising. Furthermore, the reflectivity in the map is very low for distant points. The depth map can be used to calibrate the reflectivity map in a straightforward way by inversing the inverse square law.

For example, the reflectivity and distance maps are smooth. This smoothness can be characterized as a small total variation norm or as sparsity in a smooth basis, such as wavelets. The total variation norm on the depth map $\hat{d}$ is defined as $$\|\hat{d}\|_{TV} = \|\nabla_i \hat{d}_{i,j}\|_p + \|\nabla_j \hat{d}_{i,j}\|_p = \left(\sum_{i,j} |\hat{d}_{i,j} - \hat{d}_{i+1,j}|^p\right)^{1/p} + \left(\sum_{i,j} |\hat{d}_{i,j} - \hat{d}_{i,j+1}|^p\right)^{1/p},$$

typically for $p=1$ or $2$, and similarly for the reflectivity map $\hat{a}$.

To enforce smoothness in total variation the processor may compute one of a number of optimization problems, such as $$\min_{\hat{d}} \|\hat{d}\|_{TV}$$

-continued s.t.

$$\|\hat{d} - \tilde{d}\|_2 \leq \epsilon$$

or $$\min_{\tilde{d}} \|\tilde{d}\|_{TV} + \lambda \|\hat{d} - \tilde{d}\|_2^2,$$

where the $l_p$ norm is defined as $\|d\|_p = (\Sigma_{i,j} |d_{i,j}|^p)^{1/p}$, and $\epsilon$ and $\lambda$ are parameters controlling the smoothing, i.e., the amount of de-noising required. The reflectivity map can be similarly smoothed to $\tilde{a}$.

Alternatively, smoothness using sparsity in some smooth bases, such as wavelets, can be enforced in a similar manner by minimizing the $l_1$ norm of the basis coefficients, e.g., using $$\min_{\tilde{w}} \|\tilde{w}\|_1$$

s.t.

$$\|\hat{d} - B\tilde{w}\|_2 \leq \epsilon$$

or $$\min_{\tilde{w}} \|\tilde{w}\|_{TV} + \lambda \|\hat{d} - B\tilde{w}\|_2^2,$$

where $\tilde{w}$ are the coefficients of the map in the basis B. The depth map estimate is then computed from the coefficients as $\tilde{d} = B\tilde{w}$. The reflectivity map can be similarly smoothed to $\tilde{a}$.

In both de-noising cases, as the parameter $\epsilon$ approaches to zero, or the parameter $\lambda$ approaches to infinity, de-noising is less effective and the resulting maps are closer to the original estimates. On the other hand, as $\epsilon$ increases or $\lambda$ decreases, de-noising is more aggressive and makes the image maps too smooth to be realistic. For example, as $\epsilon$ goes to infinity or $\lambda$ to zero in the TV minimization, the map becomes constant, i.e., flat, conveying no useful information.

Figure 4:
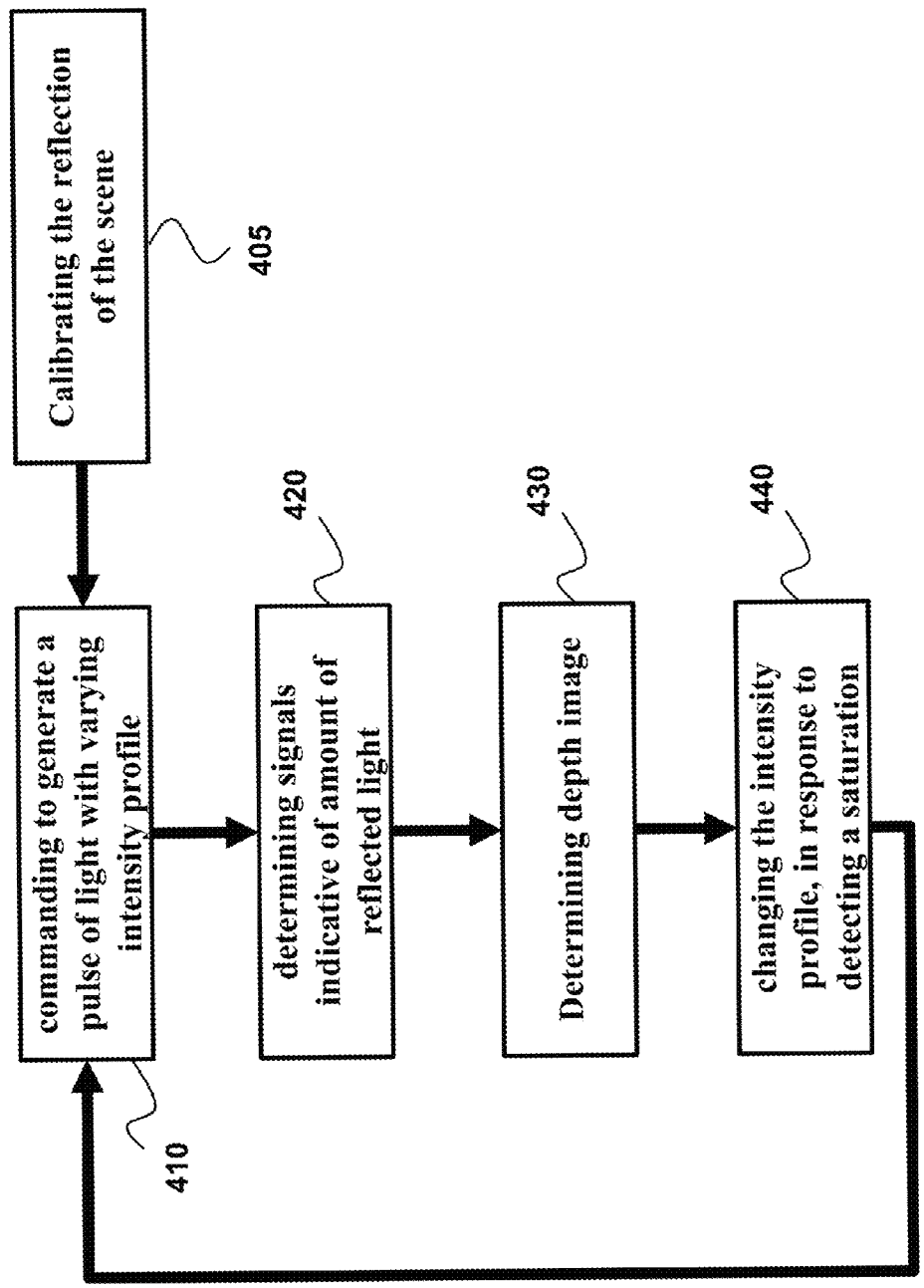
FIG. 4 is a block diagram of a method for determining a depth image according to some embodiments of the invention.

FIG. 4 shows a block diagram of a method for determining a depth image indicating distances from the system to points of a scene according to some embodiments of the invention. The method is performed by a processor 150 and includes at least some of the calculations 400. The method includes commanding 410 the light source to generate a first pulse of light having a first intensity profile with different non-zero intensity values. The first pulse is directed toward the scene by the light source, and determining 420 a first set of signals indicative of amount of light of the first pulse reflected from each point in the scene within a first period of time. Before or after illumination the scene 410, the method can calibrate 405 the reflection of the scene illuminated by different types of the light pulses or under natural illumination. The objective of the calibration 405 is to provide additional measurements for determining multiple unknowns of depth image estimation, as described above. For example, the calibration can be performed with a flat pulse, without transmitting any light pulse and/or with a light pulse of a profile different that the profile generated in step 410.

Next, the processor determines 430, based on a magnitude of the signals associated with each point, the depth image having intensity values indicative of the distances to the points in the scene. In one embodiment, the processor also commands to change the first intensity profile, in response to detecting a saturation of the sensors. This embodiment allows adapting the depth sensing to the specifics of the object in the scene. For example, the processor can command the light source to change the first intensity profile from a linearly decreasing profile to a quadratically decreasing profile.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for determining a depth image representing distances to points of a scene, comprising:
    a light source for generating and directing a set of light pulses toward the scene;
    a set of sensors for detecting and integrating light reflected from the scene, each sensor is associated with a point in the scene and generates a signal indicative of a portion of each light pulse reflected from the point in the scene and reaching the sensor during a corresponding period of time; and
    at least one processor for coordinating operations of the light source and the set of sensors, such that each light pulse is integrated within the corresponding period of time, and for determining, based on a magnitude of the signal associated with each point, the depth image having intensity values representing the distances to the points in the scene, wherein the processor commands the light source to generate the set of light pulses including a first pulse with a first intensity profile having portions of identical lengths with different integrated intensities, wherein the processor commands to increase the intensity values of the first intensity profile to reach a maximal intensity value with subsequent decreasing of the intensity values through different non-zero intensity values, wherein the first intensity profile is decreasing over time for more than a half of a length of the first pulse, wherein the length of the first pulse is a function of a depth range of the intensity values in the depth image.

2. The system of claim 1, wherein the first pulse is formed by a set of unit pulses of different width.

3. The system of claim 1, wherein the first intensity profile is linearly decreasing starting from a maximal value of the first intensity profile.

4. The system of claim 1, wherein the first intensity profile is quadratically decreasing starting from a maximal value of the first intensity profile.

5. The system of claim 1, wherein the set of light pulses includes a second pulse having a second intensity profile, and wherein the second intensity profile is different from the first intensity profile.

6. The system of claim 5, wherein the second intensity profile is flat.

7. The system of claim 5, wherein the first intensity profile is linearly decreasing starting from a maximal value of the first intensity profile, and wherein the second intensity profile is quadratically decreasing starting from a maximal value of the second intensity profile.

8. The system of claim 1, further comprising:
a gating module allowing the light to reach the set of sensors only during the period of time, wherein the set of light pulses includes a second pulse having a second intensity profile, wherein the light source generates the first pulse and the second pulse sequentially, wherein the gating module permits a portion of the first pulse to reach the set of sensors within a first period of time, and permits a portion of the second pulse to reach the set of sensors within a second period of time, wherein a length of the first period of time is different than a length of the second period of time.

9. The system of claim 1, wherein the processor determines the depth image by solving a system of equations including a first equation representing an integration of the first pulse, a second equation representing an integration of the second pulse, a third equation representing an integration of ambient light integrated without transmission of the light pulses.

10. The system of claim 1, wherein the processor commands to change the first intensity profile in response to detecting a saturation of at least one sensor in the set of sensors.

11. The system of claim 10, wherein the processor commands to change the first intensity profile, in response to detecting the saturation, from a linearly decreasing profile to a quadratically decreasing profile.

12. A method for determining a depth image indicating distances to points of a scene, comprising:
commanding to generate a first light pulse having a first intensity profile with varying integrated intensity over a window sliding within the first pulse and to direct the first light pulse toward the scene;
commanding to change the first intensity profile, in response to detecting a saturation of at least one sensor detecting and integrating light reflected from the scene, from a linearly decreasing profile to a quadratically decreasing profile;
determining a first set of signals indicative of amount of light of the first pulse reflected from each point in the scene within a first period of time; and
determining, based on a magnitude of the signals associated with each point, the depth image having intensity values indicative of the distances to the points in the scene, wherein at least some steps of the method are performed using a processor.

13. The method of claim 12, further comprising:
commanding to generate a second pulse of light having a second intensity profile different from the first intensity profile;
determining a second set of signals indicative of amount of light of the second pulse reflected from each point in the scene within a second period of time; and
determining the depth image using the first and the second set of signals.

14. The method of claim 12, further comprising:
generating, using a light source, the first pulse of light having the first intensity profile;
detecting and integrating, using a set of sensors, light of the first pulse reflected from the scene, each sensor in the set of sensors is associated with a point in the scene to generate at least the first set of signals;
preventing, using a gating module, the light of the first pulse to reach the set of sensors outside of the first period of time.

15. The method of claim 12, further comprising:
commanding to change the first intensity profile, in response to detecting a saturation.

16. The method of claim 12, wherein the first intensity profile is decreasing over time for more than a half of duration of the first pulse.

17. The method of claim 12, wherein the first pulse is formed by a set of unit pulses of different width resulted in the first intensity profile with integrated intensity decreasing over time for more than a half of duration of the first pulse.

18. A system for determining a depth image representing distances to points of a scene, comprising:
a light source for generating and directing a set of light pulses toward the scene;
a set of sensors for detecting and integrating light reflected from the scene, each sensor is associated with a point in the scene and generates a signal indicative of a portion of each light pulse reflected from the point in the scene and reaching the sensor during a corresponding period of time; and
at least one processor for coordinating operations of the light source and the set of sensors, such that each light pulse is integrated within the corresponding period of time, and for determining, based on a magnitude of the signal associated with each point, the depth image having intensity values representing the distances to the points in the scene, wherein the processor commands the light source to generate the set of light pulses including a first pulse with a first intensity profile having portions of identical lengths with different integrated intensities; and
a gating module allowing the light to reach the set of sensors only during the period of time, wherein the set of light pulses includes a second pulse having a second intensity profile, wherein the light source generates the first pulse and the second pulse sequentially, wherein the gating module permits a portion of the first pulse to reach the set of sensors within a first period of time, and permits a portion of the second pulse to reach the set of sensors within a second period of time, wherein a length of the first period of time is different than a length of the second period of time.

\* \* \* \* \*